US008768875B2

(12) United States Patent
Xiong et al.

(10) Patent No.: US 8,768,875 B2
(45) Date of Patent: Jul. 1, 2014

(54) ADMISSION CONTROL IN CLOUD DATABASES UNDER SERVICE LEVEL AGREEMENTS

(75) Inventors: Pengcheng Xiong, Cupertino, CA (US); Yun Chi, Monte Sereno, CA (US); V. Hakan Hacigumus, San Jose, CA (US); Junichi Tatemura, Cupertino, CA (US); Shenghuo Zhu, Cupertino, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 423 days.

(21) Appl. No.: 13/251,215

(22) Filed: Oct. 1, 2011

(65) Prior Publication Data

US 2012/0109873 A1  May 3, 2012

Related U.S. Application Data

(60) Provisional application No. 61/408,257, filed on Oct. 29, 2010.

(51) Int. Cl.
| | |
|---|---|
| *G06F 9/44* | (2006.01) |
| *G06N 7/02* | (2006.01) |
| *G06N 7/06* | (2006.01) |
| *G06Q 10/06* | (2012.01) |
| *G06Q 30/00* | (2012.01) |

(52) U.S. Cl.
CPC ...... *G06Q 10/06316* (2013.01); *G06Q 10/0633* (2013.01); *G06Q 30/01* (2013.01)
USPC .......................................................... 706/52

(58) Field of Classification Search
None
See application file for complete search history.

(56) References Cited

U.S. PATENT DOCUMENTS

2010/0082507 A1* 4/2010 Ganapathi et al. .............. 706/12

OTHER PUBLICATIONS

'Poster session: Towards a QoSaware DBMS': Costa, 2008, IEEE, 978-1-4244-2144, pp. 50-55.*
'SLA-Aware Profit Optimization in Cloud Services via Resource Scheduling': Moon, Jul. 2010, IEEE 978-0-7695, pp. 152-153.*
'A Metascheduler Architecture to provide QoS on the Cloud Computing': Peixoto, 2009, IEEE 978-1-4244-6247, pp. 659-657.*
'Intelligent Management of Virtualized Resources for Database Systems in Cloud Environment': Xiong, 2011, IEEE, 978-1-4244-8960, pp. 87-98.*
Elnikety, S., Nahum, E., Tracey, J., and Zwaenepoel, W. A method for transparent admission control and request scheduling in e-commerce web sites. In WWW '04: Proceedings of the 13th international conference on World Wide Web (New York, NY, USA, 2004), ACM, pp. 276-286.
Tozer, S., Brecht, T., and Aboulnaga, A. Q-cop: Avoiding bad query mixes to minimize client timeouts under heavy loads. In IEEE International Conference on Data Engineering (2010).

* cited by examiner

*Primary Examiner* — Wilbert L Starks
*Assistant Examiner* — Peter Coughlan
(74) *Attorney, Agent, or Firm* — Joseph Kolodka; Akitaka Kimura

(57) ABSTRACT

An admission control system for a cloud database includes a machine learning prediction module to estimate a predicted probability for a newly arrived query with a deadline, if admitted into the cloud database, to finish its execution before said deadline, wherein the prediction considers query characteristics and current system conditions. The system also includes a decision module applying the predicted probability to admit a query into the cloud database with a target of profit maximization with an expected profit determined using one or more service level agreements (SLAs).

17 Claims, 3 Drawing Sheets

(a) ActiveSLA  (b) TYPE & Q-Cop (a)  (b)

ADMISSION CONTROL IN CLOUD DATABASES UNDER SERVICE LEVEL AGREEMENTS

This application claims priority to U.S. Provisional Application Ser. No. 61/408,257 filed Oct. 29, 2010, the content of which is incorporated by reference.

BACKGROUND

Cloud computing is becoming an increasingly common platform for offering database services. Cloud database service providers usually serve diversified clients through multi-tenancy resource sharing. Unlike the traditional hosting model where database service runs on dedicated nodes, cloud computing enables the tenants to be consolidated onto fewer nodes, reducing capital expenditure on infrastructure as well as operating costs on power, cooling, maintenance, and support. Cloud computing can lead to high resource utilization on the shared nodes.

Due to the changing resource requirements and unpredictable interactions, it is non-trivial for cloud database service providers to meet the service level agreements (SLAs) for the hosted tenants. One approach to overcome such a challenge is through capacity planning. For example, by analyzing historic data, one can place compatible sets of tenants onto shared nodes or can alleviate overloading conditions through live migration at the virtual machine level. However, as a solution, capacity planning has some weak points: on the one hand the tenants' workload may change over time and on the other hand, live migration may have high overhead which may further degrade performance of already congested nodes.

One widely adopted approach for preventing system from overloading is to use admission control. By using admission control, when the system is in an overloading condition, newly arrived queries are either buffered or rejected until the system condition improves. The purpose of admission control in a database system is to limit the number of concurrently running queries in the database server. One reason for admission control is that if the queries are admitted into the database server indiscriminately, the workload may saturate the database server and therefore make the performance of all running queries suffer.

Admission control methods can be categorized as those with load shedding and those without. With load shedding, when the system is overloaded, an admission control method can reject new requests in order to prevent the system from being further saturated; without load shedding, an admission control method temporarily postpones queries from entering the server, in order to keep the server at its peak throughput. Admission control with load shedding is appropriate in an e-commerce application, as queries usually have associated deadlines in query response time (e.g., useful query result has to be obtained before the browser's timeout). Therefore, instead of postponing a query only later to find it missed its deadline, a more beneficial control strategy is to reject the query upfront, because doing so leaves room for other solutions such as routing the query to a remote server.

For a service provider who offers Database as a Service (DaaS), the admission control takes place in the database layer and the users of the database (either the end customers or the applications) are treated as the clients or tenants. A common practice in traditional databases is to maintain the multiple programming level (MPL) of the database server through admission control. In a cloud database system, however, because of the diversified queries from various shared tenants, the relationship between MPL and query response time becomes highly complicated. Hence, in a cloud database system, the admission control is even more challenging because of the diversified workloads from multiple clients and because of the direct monetary consequence of missing a contracted deadline.

SUMMARY

An admission control system for a cloud database includes a machine learning prediction module to estimate a predicted probability for a newly arrived query with a deadline, if admitted into the cloud database, to finish its execution before said deadline, wherein the prediction considers query characteristics and current system conditions. The system also includes a decision module applying the predicted probability to admit a query into the cloud database with a target of profit maximization with an expected profit determined using one or more service level agreements (SLAs).

Advantages of the preferred embodiment may include one or more of the following. The prediction module uses machine learning techniques to predict the probabilities for a newly arrived query to meet or miss its deadline. The machine learning techniques (1) take into consideration many query related features as well as database system related features, (2) recognize complex patterns from the data in an automatic way, and (3) provide detailed probabilities for different outcomes. The decision module uses a profit maximization approach based on SLAs. Decisions are made by this module in a holistic fashion by considering (1) the probability for the newly arrived query to meet its deadline under the current system condition, (2) the profit consequence of different actions and different outcomes, and (3) the potential impact of admitting this query on the currently running queries as well as on the future queries. The system enables cloud databases to take into consideration in admission control the factor of profit. Compared with traditional databases, profit plays a central role in cloud database systems. Among the multiple tenants that share the same resources, each tenant may have a different profit profile and such a profit profile very often is dictated by a service level agreement (SLA) between the tenant and the service provider. The system enables the cloud database service provider to improve profit margin by making differentiated admission control decisions in an intelligent way, based on factors such as client SLAs and current system conditions. The system brings commercial values in terms of improving the profit margins for a service provider of a cloud computing system and improving user experiences.

BRIEF DESCRIPTION OF THE DRAWINGS

FIG. 3A shows exemplary machine learning techniques used in the admission control system of FIG. 2, while FIG. 3B shows prior art machine learning techniques.

FIG. 4A shows exemplary general SLAs while FIG. 4B shows exemplary step-function SLAs.

DESCRIPTION

Figure 1:
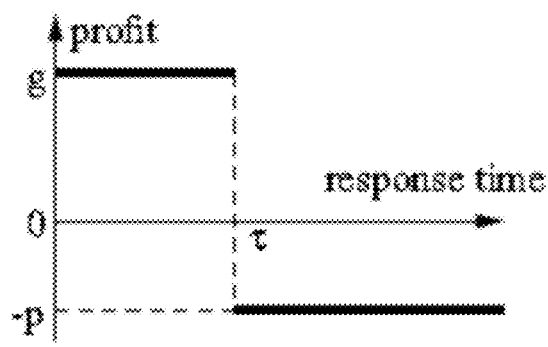
FIG. 1 shows an exemplary SLA profit function.
Figure 2:
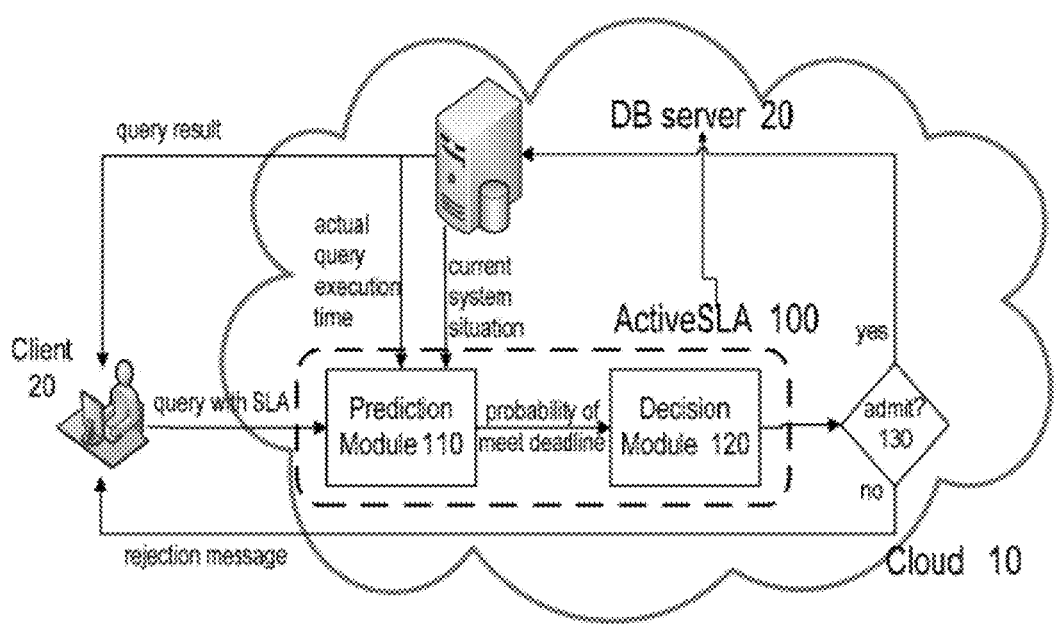
FIG. 2 shows an exemplary SLA based admission control system.

FIG. 2 shows an exemplary system 100 for admission control that takes service level agreements (SLAs) into consideration. An SLA is a contract between a service provider and its clients: the SLA determines the promised service performances and the corresponding profits (or penalties). SLAs in general depend on certain chosen criteria, such as service latency, throughput, consistency, security, among others. In one embodiment, the SLAs are based on query latency, i.e., query response time. From a service provider's point of view, an SLA based on query response time usually can be described as a function of response time versus profit. Although such a function may take different forms, a step function SLA profit function is shown in FIG. 1. For a give query q, if it is finished within $\tau$, the service provider obtains a profit gain of g; otherwise the service provider pays a penalty of $-p$. Such a step function is commonly used in real contracts because it is easy to describe. In addition, in this embodiment, if the service provider rejects a query upfront, the provider will pay a lesser penalty of $-r$ (i.e., r<p). The reason for the lesser penalty of rejecting a query upfront is that doing so saves clients the waiting time (e.g., waiting for the browser time out). The system of FIG. 2 uses SLA profit as the final criteria to measure the performance of various admission control strategies.

FIG. 2 shows an exemplary SLA based admission control system 100. The system 100, named ActiveSLA, makes intelligent admission control decisions in a profit-oriented way. The system 100 includes two main modules: a prediction module 110 and a decision module 120. The prediction module 110 uses machine learning techniques to predict the chance for an incoming query to miss its deadline under a given system condition. The decision module 120 makes profit-oriented decisions on admission control where the decisions are based on the output from the prediction module 110 as well as the SLA of the queries. The system of FIG. 2 considers the expected profits in admission control decision in order to achieve the maximal expected profit, to learn a prediction models in order to consider the overall profit accurately, and to take the query profile as well as current conditions of database server into consideration.

When a new query arrives at the system, it first enters the prediction module 110 of ActiveSLA. By using machine learning techniques and by considering both the characteristics of the query and the current conditions of the system, the prediction module outputs a probability for the query to be finished before its deadline. Based on this probability as well as the SLA, the decision module decides to either admit the query into the system or reject the query up-front. Moreover, if the query is admitted, the system conditions and the actual query execution time (as opposed to the expected one) of each query are constantly collected by ActiveSLA in order to update the prediction module after it finishes. This feedback mechanism can further help the prediction module to make better decisions.

One function of the prediction module 110 is, for each newly arrived query q, to predict the probability that q would be completed before its deadline (assuming q were admitted into the database immediately). The prediction module uses machine learning techniques which, due to their data-driven characteristics, can automatically recognize complex patterns from the data and provide models with performances comparable to domain experts. The prediction module 110 determines such a probability by using historic data and machine learning techniques such as TYPE and Q-Cop. However, ActiveSLA differs from TYPE and Q-Cop in two aspects. First, ActiveSLA uses machine learning techniques and models that are appropriate for the task of predicting whether a query can meet its deadline. Second, ActiveSLA extracts a much richer set of features from historic data to be used in the models. These two aspects contribute to the improvement of accuracy of the prediction module 110 in one embodiment.

TYPE and Q-Cop approaches start by predicting the execution time of a query for each query type. Assume that there are T types of queries, both TYPE and Q-Cop build a model for each query type.

In TYPE, the estimated execution time of a query $q_i$ of type i is $Est_i = e_i * N + E_i$, where $E_i$ is the query execution time of $q_i$ in a dedicated server, N is the total number of other queries currently running in the system, and $e_i$ is the extra delay that each additional current running query brings to $q_i$.

Compared with TYPE, Q-Cop uses more detailed information. Instead of counting N, Q-Cop considers $\{n_1, \ldots, n_T\}$, the number of currently running queries of each query type (with $\Sigma_{j=1}^{T} n_j = N$), which is referred to as the query mix. Q-Cop uses a linear regression model to estimate the running time of $q_i$ as $Est_i = (e_{i1} * n_1) + (e_{i2} * n_2) + \ldots + (e_{iT} * n_T) + E_i$. Here $e_{ij}$ is the extra delay that each additional current running query of type j brings to $q_i$.

Figures 3A, 3B:
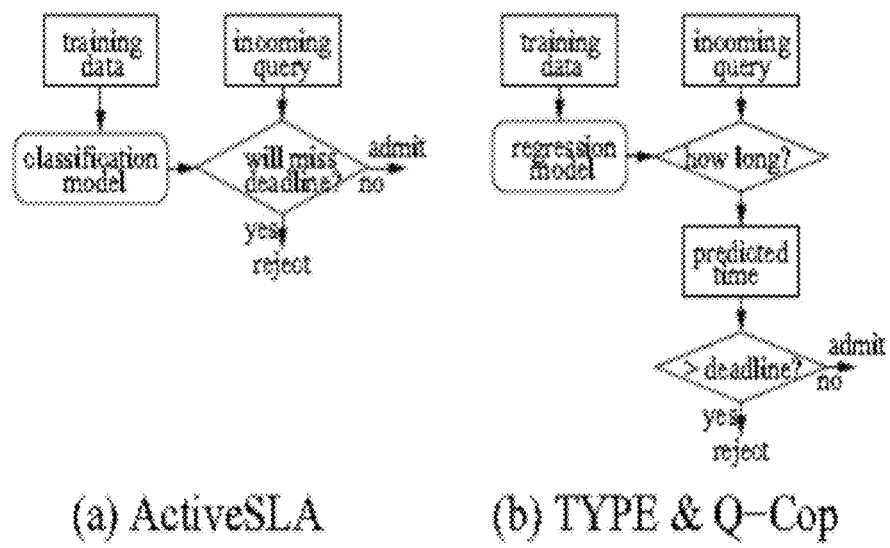

Compared to TYPE and Q-Cop, the prediction module 110 uses a classification model to directly predict the probability that a newly arrived query can/cannot meet its deadline as shown in FIG. 3. A classification model is preferred over a regression model for two reasons. The first reason is that, as the final goal is to make admission control decisions, the probability for a query to meet the deadline or not rather is more important than the exact execution time of the query. From the machine learning point of view, a direct model of classification usually outperforms a two-step approach (i.e., step one, use regression first to get an estimation on execution time, with an objective of minimizing the mean square error; and step two, compare this estimated value with the deadline). The second reason is that, TYPE and Q-Cop only give $Est_i$, i.e., the estimated execution time of $q_i$. This single point model estimation does not provide information on reliability, and so there is not enough information for the system to make profit-aware decisions based on SLAs. In comparison, the classification model used in ActiveSLA provides the probabilities of a query meeting or missing its deadline. This information is important in making SLA-based admission control decisions.

Various embodiments of TYPE and Q-Cop use linear regression models, which model the relationship between the input features and the output variables by using linear functions. However, the execution time of a query depends on many factors in non-linear fashions. For example, a main goal of many database techniques, such as multiple programming levels and pipelining, is to make the system performance degrades in sublinear fashions as the workload increases. As another example, it is well known in database and queuing theories that when a system is at a borderline overloading condition, a small amount of additional workload will disproportionally degrade the system performance. As a result, the preferred embodiment uses non-linear models. The main machine learning technique for the nonlinear models is the LogitBoost algorithm implemented in the well-known off-the-shelf WEKA package. Logit-Boost is a boosting approach where a set of weak learners (namely, models that may not have exceptionally good performance by themselves but collectively contribute to the final performance) are iteratively learned any combined in order to obtain a strong classifier with good performance. For the weak learners, a standard tree model is used which partitions the parameter space in a top-down and nonlinear fashion. LogitBoost can be used for both regression and classification.

The accuracy of a machine learning model depends in part on the features used to learn the model. In addition to the (rather limited) features used by TYPE and Q-Cop, ActiveSLA exploits a lot of additional features from query characteristics and system conditions. We start from introducing the features used by TYPE and Q-Cop. TYPE and Q-Cop use the number of currently running queries as the feature in their model for each query type. For a query $q_i$ with query type i, TYPE uses N, the total number of currently running queries, as the only feature to predict query execution time of $q_i$. Q-Cop improves over TYPE by splitting N into a set of features $n_1, \ldots, n_T$, which are referred to as the query mix in Q-Cop. That is, Q-Cop takes into consideration that different query type (e.g., j) may impact the execution time of $q_i$ in different ways (reflected by $e_{ij}$ in the Q-Cop model).

Even for queries of the same query type (i.e., queries that share the same query template), the parameters of a query may affect its execution time, especially when the query contains aggregations or range selections. To extract features related to query parameters and characteristics, query optimization techniques are applied to the query plan and query cost estimation from the database. PostgreSQL and MySQL optimizations are used as examples, although the same idea applied to other databases. In one embodiment with PostgreSQL, the query cost estimation depends mainly on 5 parameters, i.e., the number of sequential I/O (seq page), the number of non-sequential I/O (random page), the number of CPU tuple operations (cpu tuple), the number of CPU index operations (cpu index), and the number of CPU operator operations (cpu operator). Although these parameters are used mainly for PostgreSQL query optimizer to compare the relative costs among different query plans, the estimations of these parameters obtained by the query optimizer have strong correlation with the execution time of the query, and therefore the five estimations from the query optimizer are used as a set of features for the ActiveSLA prediction module. MySQL uses similar "explain" command to show how MySQL handles the queries.

In addition to studying queries themselves, ActiveSLA also takes into consideration the environment in which the queries will be running. More specifically, ActiveSLA monitors the following features from the database server and operating system.

Buffer cache: the fraction of pages of each table that are currently in the database buffer pool and therefore are available without accessing the disk;

System cache: the fraction of pages of each table that are currently in the operating system cache and therefore can be brought into the database buffer pool without accessing the disk;

Transaction isolation level: a Boolean variable that indicates if the database is currently supporting transaction consistency through the use of locks;

CPU, memory, and disk status: the current statuses of CPU, memory, and disk 10 in the operating system.

The task of the decision module 120 in ActiveSLA is to make the final decision on whether or not to admit a newly arrived query. An immediate question is how to measure if the decision module makes the right decisions. For example, the decision module 120 can aggressively rejects many queries and makes the response time of the admitted queries very short; or the decision module 120 can conservatively admit many queries. In the SLA-driven approach, the performance of a decision module 120 is measured by the profit it produces, where the profits of different consequences are described by service level agreements (SLAs). Additionally, under step-function SLAs, the output of the prediction module of ActiveSLA is sufficient for the decision module 120.

Figure 4:
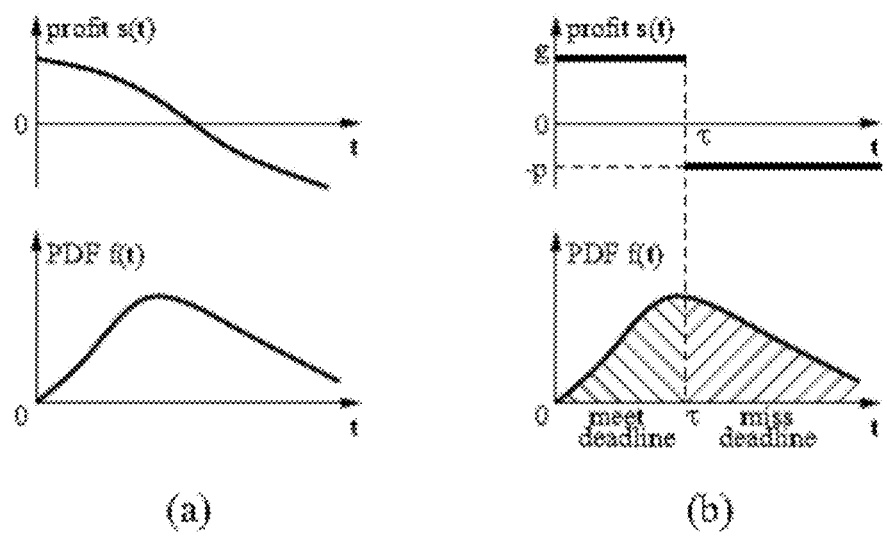

In the SLA-driven Decision Making module 120, for a newly arrived query q, there is an associated SLA that determines the profit that will be obtained by the service provider under different query response time for q. An example of such an SLA is shown in FIG. 4A, where the profit is a function s(t) over the query response time t when the query is admitted. The service provider needs to pay back r if the query is rejected. The system needs to obtain a probability density function (PDF) for the execution time of q, as f(t) shown in FIG. 4A.

The expected profit E[profit(q)] for query q can be determined as $$E[\text{profit}(q)] = \int_{t=0}^{\infty} s(t) \cdot f(t) dt$$

then the admission decision that maximizes the SLA profit should be $$\text{Decision} = \begin{cases} \text{Admit} & \text{if } E[\text{profit}(q)] > -r \\ \text{Reject} & \text{otherwise} \end{cases}$$

The PDF in FIG. 4A is difficult to obtain for each incoming query. In one embodiment with step-wise SLA, a step function is commonly used in real SLA contracts because it is easy to be described in natural language. The step-wise SLA is shown in FIG. 4B and Table 1 below:

|  | Meet Deadline | Miss Deadline |
| --- | --- | --- |
| Admit | g | −p |
| Reject | −r | −r |

For a give query q, if the query is admitted and meet the deadline τ, the service provider obtains a profit gain of g; else if the query miss the deadline τ, the service provider pays a penalty of −p. Otherwise the service provider rejects the query up-front and pay a less penalty of −r (i.e., r<p). Thus, to compute the expected profit under the step-wise SLA, the system only needs to determine the area under f(t) before τ and that after τ, which are actually the probabilities of meeting and missing the deadline obtained from the prediction module 110.

One embodiment determines the probabilities of meeting and missing the deadline obtained from the prediction module 110 to compute the expected profit under the step-wise SLA. That is, if the prediction module 110 determines the probability of the query to meet the deadline is c, then $E[\text{profit}(q)] = g \cdot c - p \cdot (1-c)$. Thus the exact PDF for the response time of q is not necessary for admission decision anymore. The admission decision is made as $$\text{Decision} = \begin{cases} \text{Admit} & \text{if } g \cdot c - p \cdot (1-c) > -r \\ \text{Reject} & \text{otherwise} \end{cases}$$

Next, opportunity cost will be considered. So far, the admission control decision is based on the expected profit of q. However, once admitted, the execution of q will consume system resources, and thus admitting q has certain additional hidden cost. For example, admitting q into the database server may slow down the execution of the queries that are currently running in the server and therefore potentially make them miss the deadlines that they were able to meet. As another example, admitting q may result in the rejection of the next query, which may otherwise be admitted and bring in higher profit. These examples are closely related to the concept of opportunity cost in economics. In one embodiment, if the opportunity cost is o, the decision module 120 takes opportunity cost into consideration in Table 2.

According to Table 2, when o>0, the admission control can be more aggressive in rejecting new queries, in order to protect the currently running queries and to reserve resources for later queries with potentially higher profits.

|        | Meet Deadline | Miss Deadline |
|--------|---------------|---------------|
| Admit  | g – o         | –p – o        |
| Reject | –r            | –r            |

Figure 5:
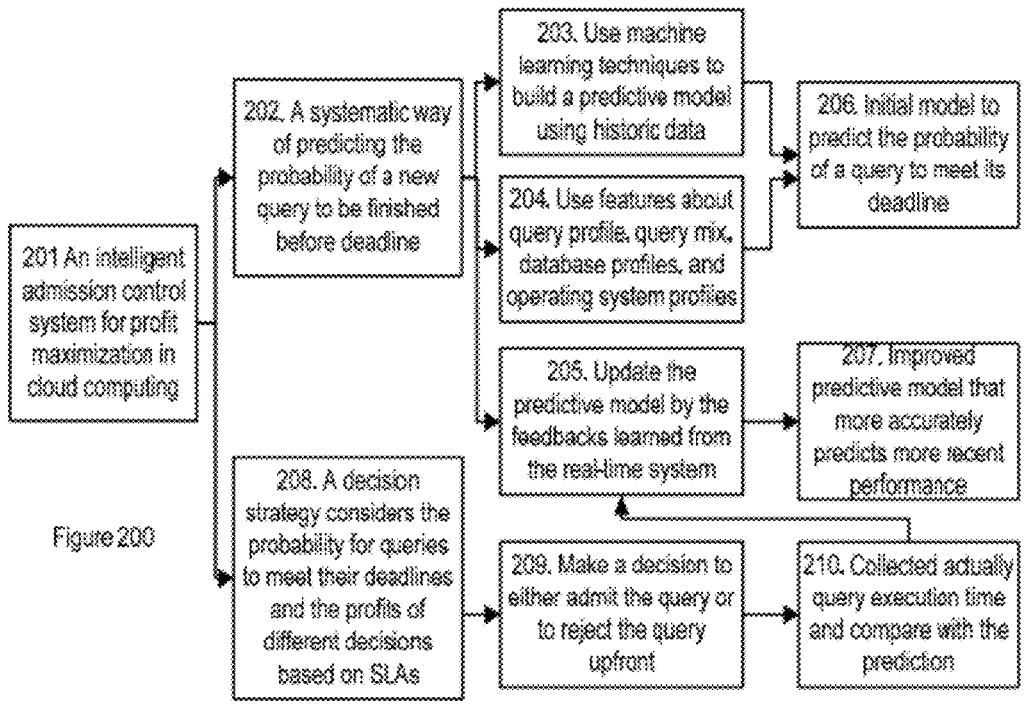
FIG. 5 shows an exemplary process for controlling query admission into cloud databases.

FIG. 5 shows an exemplary process for controlling query admission into cloud databases. In FIG. 5, an intelligent admission control process 201 for profit maximization in cloud computing includes systematically predicting the probability of a new query to be finished before deadline in 202, and executing a decision strategy that considers the probability for queries to meet their deadlines and the profits of different decisions based on SLAs in 208. In 203, the process applies machine learning techniques to build a predictive model to compute the probability for an incoming query to be finished before its deadline. In 204, the process determines features about the profile of the incoming query, the current query mix running in the database server, the profiles of current database server and the operating system. In 205, an update can be used for refining the predictive model by using more recent observation obtained in real time. In 206, based on machine learning done in 203, the process obtains an initial model that predicts under any features collected from 204 the probability for a query to be finished before its deadline. In 207, based on the feedback rule from 205, the process updates the predictive model by using more recently observed real-time data, to make the model more accurate and more up-to-date.

In 208, the process executes a decision strategy that considers the probability for queries to meet their deadlines, together with the profits of different decisions based on SLAs. In 209, the process implements the decision made in 208 on whether or not admitting the new query into the system. In 210, the process obtains new observations by recording the actual execution time of admitted queries, in order for the updating process 205 to update the prediction model in 207.

A number of experimental studies using benchmark data sets, various traffic patterns, and different SLAs demonstrate that ActiveSLA is able to make admission control decisions that are both more accurate and more profit-aware than several state-of-the-art methods.

Figure 6:
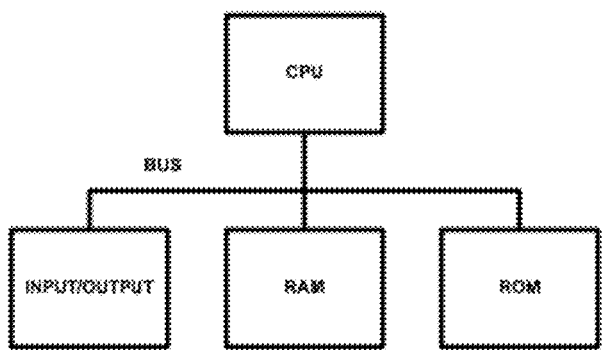
FIG. 6 shows an exemplary computer system operating the admission control system.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. By way of example, a block diagram of a computer to support the system is discussed next in FIG. 6. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for making an admission control decision in a cloud database system, the method comprising:
   systematically predicting a probability of a candidate query to be finished before a deadline;
   admitting or rejecting the candidate query to the cloud database system based on probabilities for queries to meet query deadlines and based on profits of different SLA based decisions;
   for a query q, if the query q is admitted and meet a deadline τ, obtaining a profit gain of q; else if the query q miss the deadline τ, paying a penalty –p; and
   rejecting the query q up-front and paying a reduced penalty of –r where r<p.

2. The method of claim 1, comprising predicting a probability c of an incoming query to be finished before a query deadline.

3. The method of claim 1, comprising using machine learning with an ensemble of trees to build a predictive model to determine a probability for the incoming query to be finished before a query deadline.

4. The method of claim 3, comprising refining the predictive model with recent observations obtained in real time.

5. The method of claim 1, comprising capturing features including: a profile of the incoming query, a current query mix running in the database server, one or more database server profiles, one or more operating system profiles.

6. The method of claim 1, comprising generating an initial model from machine learning, wherein the initial model predicts from collected features a probability for a query to be finished before its deadline.

7. The method of claim 6, comprising updating the predictive model using observed real-time data to make the predictive model more accurate and up-to-date.

8. The method of claim 1, comprising:
determining a decision based on the probability for queries to meet query deadlines and profits of different decisions based on the SLAs; and
admitting the new query into the database.

9. The method of claim 1, comprising obtaining new observations by recording actual execution times of admitted queries, and updating the prediction model.

10. The method of claim 1, comprising:
maximizing expected profits in admission control decision;
determining through machine learning a prediction model to accurately consider overall profit, and
taking a query profile and current conditions of the cloud database computer.

11. The method of claim 1, comprising determining an expected profit $E\,[profit(q)] = g \cdot c - p \cdot (1-c)$, where c is a probability value from a predictive model.

12. The method of claim 11, comprising admitting the query q if $g \cdot c - p \cdot (1-c) > -r$ and otherwise rejecting the query.

13. A non-transitory computer readable medium storing a program causing a computer to execute an admission control for a cloud database, the admission control comprising:
determining a probability for a candidate query with a deadline to finish execution before the deadline, if admitted into the cloud database, wherein the prediction module considers query characteristics and current system conditions;
applying the predicted probability to admit a query into the cloud database with a profit maximization target and with an expected profit determined by a service level agreement (SLA) for each query;
for a query q, if the query q is admitted and meets a deadline τ, obtaining a profit gain of q; else if the query q misses the deadline τ, paying a penalty −p; and
rejecting the query q up-front and paying a reduced penalty of −r where r<p.

14. The non-transitory computer readable medium of claim 13, the admission control comprising determining an expected profit $E\,[profit(q)] = g \cdot c - p \cdot (1-c)$ where c is a probability value from a predictive model.

15. The non-transitory computer readable medium of claim 14, the admission control comprising admitting the query q if $g \cdot c - p \cdot (1-c) > -r$ and otherwise rejecting the query.

16. An admission control method for a cloud database, the admission control method comprising:
determining a prediction of a probability for a query q with a deadline to finish execution before the deadline, if admitted into the cloud database, wherein the prediction considers query characteristics and current system conditions;
applying the probability to admit the query q to run in the cloud database with a profit maximization target and with an expected profit determined by a service level agreement (SLA) for the query q,
if the query q is admitted and meets a deadline τ, obtaining a profit gain of g and if the query q misses the deadline r, paying a penalty −p;
rejecting the query q up-front and paying a reduced penalty of −r where r<p; and
determining an expected profit $E\,[profit(q)] = g \cdot c - p \cdot (1-c)$, where c is a probability value from a predictive model.

17. The admission control method of claim 16, comprising admitting the query q if $g \cdot c - p \cdot (1-c) > -r$ and otherwise rejecting the query.

* * * * *